(12) United States Patent
Chen et al.

(10) Patent No.: US 11,436,105 B2
(45) Date of Patent: Sep. 6, 2022

(54) DATA PROCESSING METHOD AND MEMORY CONTROLLER UTILIZING THE SAME

(71) Applicant: Realtek Semiconductor Corp., HsinChu (TW)

(72) Inventors: Yen-Chung Chen, Hsinchu (TW); Yi-Ting Wei, Hsinchu (TW); Tzu-Yu Chao, HsinChu (TW); Ming-Yuh Yeh, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/144,104

(22) Filed: Jan. 7, 2021

(65) Prior Publication Data

US 2021/0303419 A1    Sep. 30, 2021

(30) Foreign Application Priority Data

Mar. 27, 2020   (TW) .................................. 109110573

(51) Int. Cl.
*G06F 11/14*      (2006.01)
*G06F 3/06*       (2006.01)

(52) U.S. Cl.
CPC .......... *G06F 11/1469* (2013.01); *G06F 3/064* (2013.01); *G06F 3/0619* (2013.01); *G06F 3/0659* (2013.01); *G06F 3/0679* (2013.01); *G06F 11/1451* (2013.01)

(58) Field of Classification Search
CPC .... G06F 11/1469; G06F 3/0619; G06F 3/064; G06F 3/0659; G06F 3/0679; G06F 11/1451; G06F 3/0631
See application file for complete search history.

(56) References Cited

U.S. PATENT DOCUMENTS

| | | | |
|---|---|---|---|
| 2005/0086432 A1* | 4/2005 | Sakai ..................... | G06F 3/0689 711/156 |
| 2009/0094428 A1* | 4/2009 | Nagata ................ | G06F 11/2074 711/E12.001 |
| 2014/0195480 A1* | 7/2014 | Talagala .............. | G06F 16/2365 707/610 |

FOREIGN PATENT DOCUMENTS

| | | |
|---|---|---|
| CN | 110275800 A | 9/2019 |
| TW | 201437807 A | 10/2014 |
| TW | 201640497 A | 11/2016 |
| TW | 201915751 A | 4/2019 |
| TW | 201941057 A | 10/2019 |

* cited by examiner

*Primary Examiner* — David Yi
*Assistant Examiner* — Dustin B. Fulford
(74) *Attorney, Agent, or Firm* — Winston Hsu

(57) ABSTRACT

A data processing method includes: configuring a predetermined memory space to record information regarding data to be backed up of a memory device, where the information is used to indicate data associated to which logical memory space is the data to be backed up; and updating the information according to commands received from a host device.

14 Claims, 3 Drawing Sheets

DATA PROCESSING METHOD AND MEMORY CONTROLLER UTILIZING THE SAME

BACKGROUND OF THE INVENTION

Field of the Invention

The invention relates to a data processing method, more particular to a data processing method for recording information regarding data to be backed up of a memory device in real-time.

Description of the Prior Art

Users sometimes need to back up the data stored in the hard disk. When performing data backup, in order to reduce the amount of data to be written, determination of which data is new and which data is old is required. Generally, it is necessary to parse the file system supported by the operating system of the computer device to determine which data is new and which data is old. However, since the size of hard disk configured in the computer device has been greatly increased, for example, achieving several trillion bytes (or, terabytes (TB), parsing the file system will be a complicated and tedious job, and a lot of computer computing resources must be consumed since it is necessary to compare or track files one by one or to track the update time of the files. In addition, the file systems supported by different operating systems are different, and the methods of parsing the file systems are different as well. Therefore, it is necessary to design different parsing methods for different file systems, and the compatibility of different operating systems must be considered when developing the disk backup software.

To solve these problems, a data processing method for improving efficiency of the data backup operation is proposed.

SUMMARY OF THE INVENTION

It is an objective of the invention to provide a data processing method that is capable of improving efficiency of the data backup operation and solving the aforementioned problem. The spirit of the proposed method is to use the memory controller configured in the storage device to record the information regarding the data to be backed up in real-time and keep updating the information according to the access operations of the memory device. When performing data backup is required, by actively providing the information regarding the data to be backed up, the efficiency of performing data backup can be greatly improved as compared to the conventional design.

According to an embodiment of the invention, a memory controller coupled to a memory device comprises a host interface arranged to receive a plurality of commands from a host device and a processor. The processor is coupled to the host interface and arranged to record information regarding data to be backed up of the memory device. The information is used to indicate data associated with which logical memory space is the data to be backed up. The processor is arranged to configure a predetermined memory space for storing the information and update the information according to the commands.

According to another embodiment of the invention, a data processing method comprises: configuring a predetermined memory space to record information regarding data to be backed up of a memory device, where the information is used to indicate data associated with which logical memory space is the data to be backed up; and updating the information according to a plurality of commands received from a host device.

With the aid of the information regarding data to be backed up provided by the memory controller, the host device or a specific data backup software is capable of correctly recognizing the data associated with which logical memory spaces of the memory device is the data to be backed up. In this manner, the data backup can be performed in a more efficient and simple way and the problems in the conventional design can be solved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
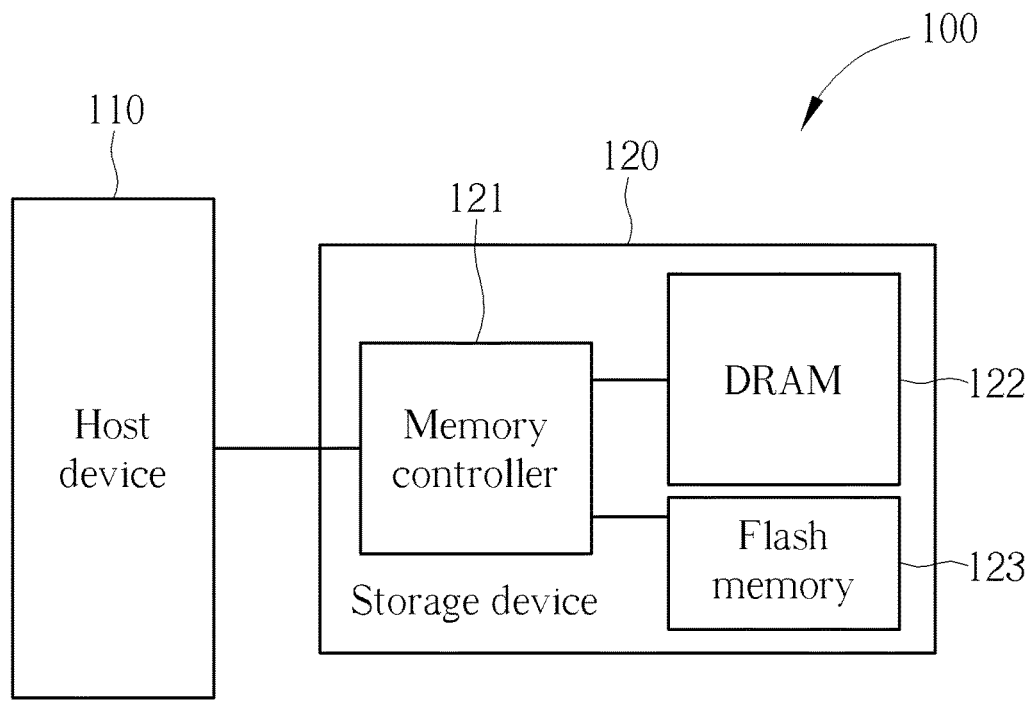
FIG. 1 is a block diagram of a system according to an embodiment of the invention.

FIG. 1 is a block diagram of a system according to an embodiment of the invention. The system may be a data storage system, a computer system or an electronic product system. The system 100 may comprise a host device 110 and a storage device 120. The storage device 120 may comprise a memory controller 121 and one or more memory devices. According to an embodiment of the invention, the storage device 120 may be a Solid State Drive (SSD) configured inside of the electronic product or connected to the electronic product. The memory controller 121 may be coupled to said one or more memory devices. The memory devices may be the Dynamic Random Access Memory (DRAM) 122 and flash memory 123 as shown in FIG. 1, and the flash memory 123 may comprise a plurality of flash memory module. The memory controller 121 may access the DRAM 122 and flash memory 123 via the corresponding interfaces. The memory controller 121 may also communicate with the host device 110 via the corresponding interface, for receiving a plurality of commands and performing corresponding memory access operations in response to the commands.

It should be noted that FIG. 1 presents a simplified block diagram in which only the components relevant to the invention are shown. As will be readily appreciated by a person of ordinary skill in the art, an electronic product system may further comprise other components not shown in FIG. 1 and arranged to implement a variety of functions.

Figure 2:
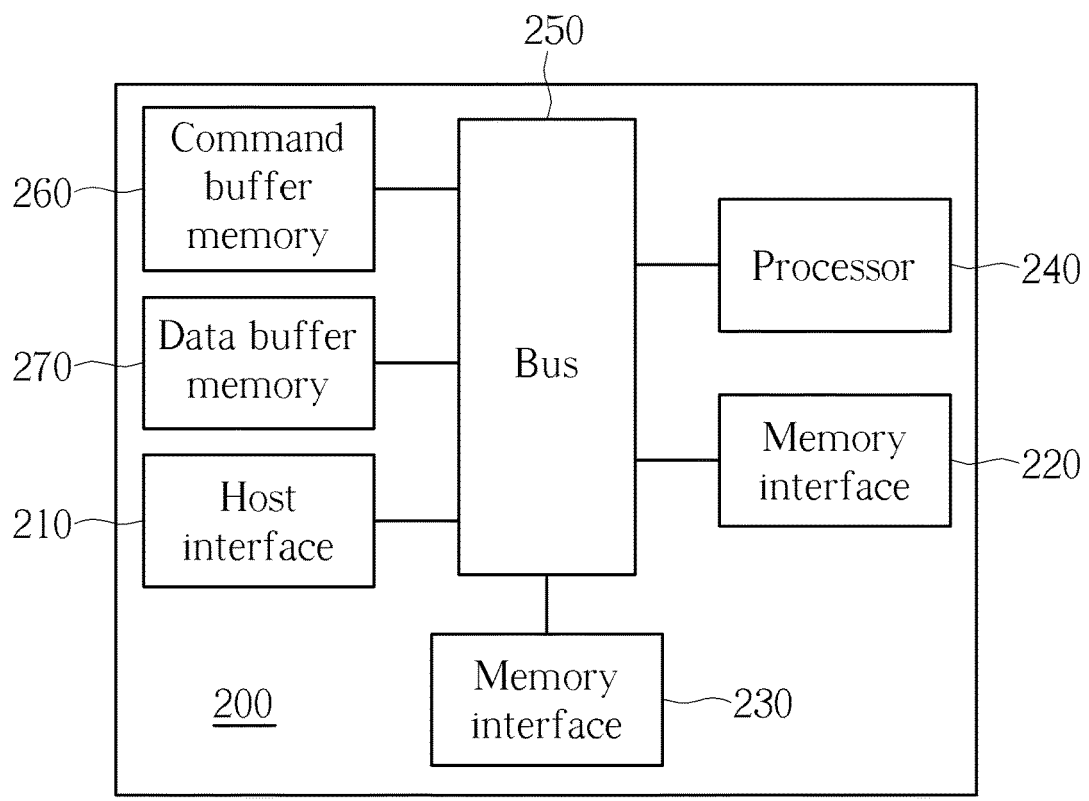
FIG. 2 is an exemplary block diagram of a memory controller according to an embodiment of the invention.

FIG. 2 is an exemplary block diagram of a memory controller according to an embodiment of the invention. The memory controller 200 may be one of a variety of implementations of the memory controller 121 shown in FIG. 1.

The memory controller 200 may comprise a plurality of interfaces, such as the host interface 210 and the memory interfaces 220 and 230. The memory controller 200 may communicate with peripheral devices via the aforementioned interfaces. The host interface 210 may be implemented by a controller, such as a Peripheral Component Interconnect (PCI) Express (PCI-E) interface/Serial Advanced Technology Attachment (SATA) controller, and is arranged to control the communication signals transmitted between the memory controller 200 and the host device 110 via the corresponding hardware interface. The memory controller 200 may receive a plurality of commands from the host device 110 via the host interface 210. The memory interface 220 may be implemented by a DRAM controller, and is arranged to control the communication signals transmitted between the memory controller 121/200 and the DRAM 122 via the corresponding hardware interface. The memory interface 230 may be implemented by a flash memory controller, and is arranged to control the communication signals transmitted between the memory controller 121/200 and the flash memory 123 via the corresponding hardware interface.

The memory controller 200 may further comprise a processor 240, a bus 250, a command buffer memory 260 and a data buffer memory 270. The processor 240 is arranged to communicate with the peripheral devices via the bus 250 and the aforementioned interfaces. The bus 250 may operate in compliance with the Open Core Protocol (OCP) and may be utilized to connect the devices such as the host interface 210, the memory interfaces 220 and 230, the processor 240, the command buffer memory 260 and the data buffer memory 270, so that they can communicate and collaborate with each other. The command buffer memory 260 and the data buffer memory 270 may be utilized to perform the command and data buffering required by the memory controller 200. The command buffer memory 260 and the data buffer memory 270 may be implemented by RAM, such as the static RAM (SRAM), but the invention should not be limited thereto.

It should be noted that FIG. 2 presents a simplified block diagram in which only the components relevant to the invention are shown. As will be readily appreciated by a person of ordinary skill in the art, a memory controller may further comprise other components not shown in FIG. 2 and arranged to implement a variety of functions.

According to an embodiment of the invention, the processor 240 may configure a predetermined memory space for storing the information regarding data to be backed up of the memory device (such as the flash memory 123), and may keep updating the information regarding data to be backed up according to access operations of the memory device. Since the access operations are controlled by the memory controller 121/200, the processor 240 may record the information regarding data to be backed up of the memory device in real-time according to the latest access operations. For example, the processor 240 may keep updating the information regarding data to be backed up according to the commands received from the host device 110.

In the embodiments of the invention, the information regarding data to be backed up of the memory device (such as the flash memory 123) is utilized to indicate data associated with which logical memory spaces of the memory device is the data to be backed up, wherein the data associated with a logical memory space may be the data logically stored in the logical memory space, and the aforementioned the data to be backed up is the data that has not been backed up by the user since completion of a previous backup operation, or the data that has been updated by the user after a previous backup operation has been performed.

Generally, the memory space of the memory device may be divided into a plurality of logical memory spaces by the host device 110. Each logical memory space may be addressed by the Logical Block Address (LBA). The data logically stored in one logical memory space may be physically stored in one or more physical memory spaces of the memory device.

For example, when a file A1 is written in a logical memory space A in response to an operation of the user, the file A1 is the data currently associated with the logical memory space A. When the file A2 is written in the logical memory space A to replace the file A1 in response to another operation of the user, the file A2 becomes the data currently associated with the logical memory space A. That is, the file A2 is the data updated by the user.

To solve the aforementioned problems occurred when performing data backup in the conventional design, in the embodiments of the invention, the processor 240 may keep recording the information regarding the data to be backed up of the memory device (such as the flash memory 123) according to the latest access operation of the memory device. With the aid of the information regarding the data to be backed up, the host device 110 or a specific data backup software is capable of correctly recognizing the data associated with which logical memory spaces of the memory device is the new data that has not been backed up (that is, the data to be backed up, or the data that is recently updated by the user). In this manner, when performing data backup is required, by actively providing the information regarding the data to be backed up to the host device 110 or the specific data backup software, the efficiency of performing data backup can be greatly improved as compared to the conventional design. Here, the aforementioned data backup software may be the software jointly developed with the proposed memory controller 121/200.

Figure 3:
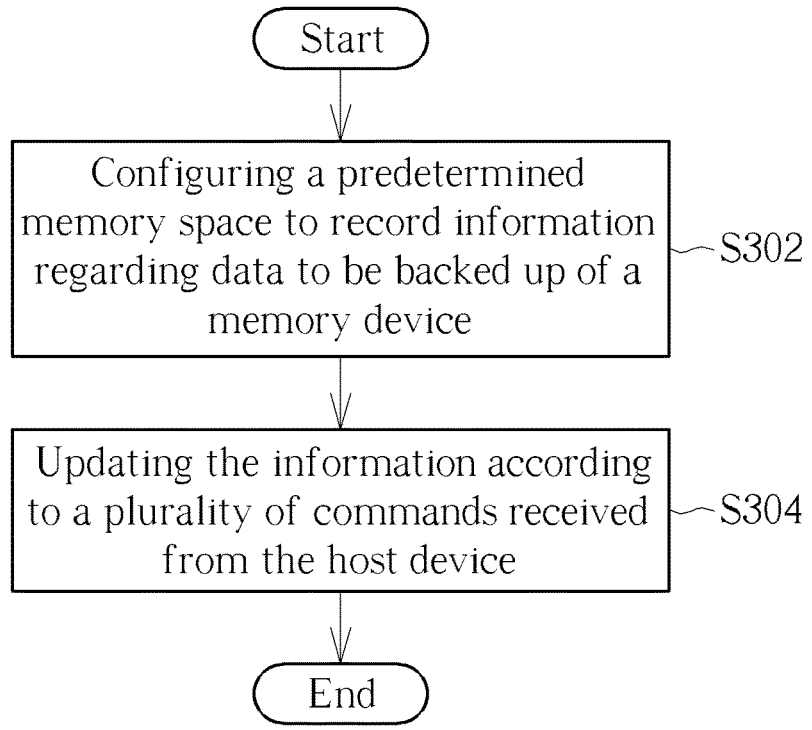
FIG. 3 is a flow chart of a data processing method according to an embodiment of the invention.

FIG. 3 is a flow chart of a data processing method according to an embodiment of the invention. The data processing method may be performed by memory controller 121/200 or the processor 240, and may comprise the following steps:

Step S302: configuring a predetermined memory space to record information regarding data to be backed up of a memory device (such as the flash memory 123). According to an embodiment of the invention, the memory controller 121/200 may configure the aforementioned predetermined memory space in the DRAM 122, the flash memory 123 or in its internal memory device (such as the data buffer memory 270). When the memory controller 121/200 configures the aforementioned predetermined memory space in a volatile memory such as the DRAM or SRAM, the memory controller 121/200 may further store the data recorded in the aforementioned predetermined memory space in the flash memory 123 before power-off, so as to preserve the data recorded therein.

Step S304: updating the information according to a plurality of commands received from the host device. As discussed above, the processor 240 may record or update the information regarding the data to be backed up of the memory device in real-time according to the received commands or the latest access operations.

According to a first embodiment of the invention, the aforementioned predetermined memory space may comprise a plurality of memory units and each memory unit may correspond to a logical memory space of the memory device.

In addition, the logical memory space may cover one or more consecutive logical block addresses (LBAs).

In addition, according to the first embodiment of the invention, the information regarding the data to be backed up may be represented by a plurality of bits. Each bit may be associated with one memory unit, and the memory device 121/200 may record the information regarding the data to be backed up by setting values corresponding to the bits.

Figure 4:
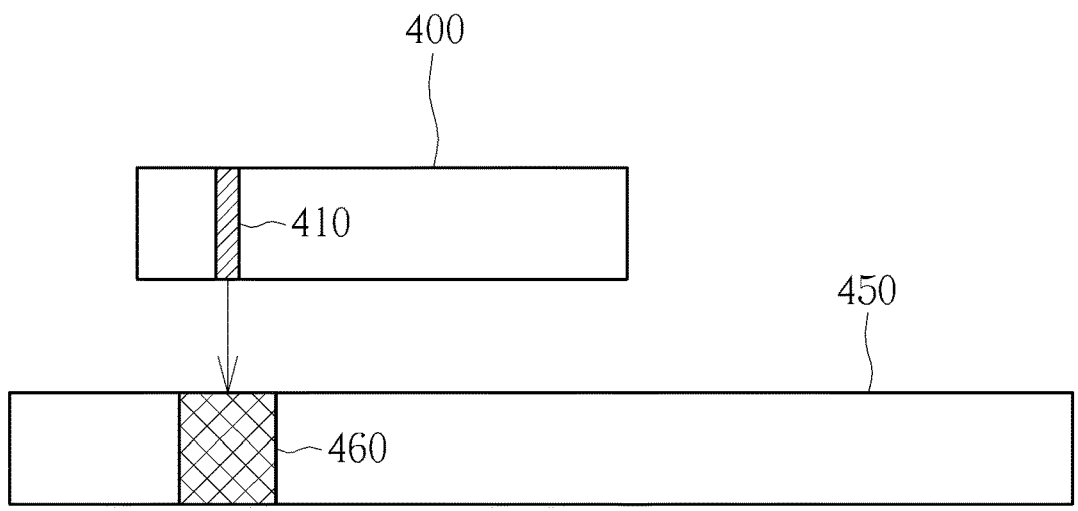
FIG. 4 is a schematic diagram showing the memory mapping between the predetermined memory space recording the information regarding the data to be backed up and the memory space of the memory device according to an embodiment of the invention.

FIG. 4 is a schematic diagram showing the memory mapping between the predetermined memory space 400 recording the information regarding the data to be backed up and the memory space 450 of the memory device (such as the flash memory 123) according to an embodiment of the invention. According to an embodiment of the invention, the predetermined memory space 400 may comprise a plurality of memory units, such as the memory unit 410. In an embodiment of the invention, each memory unit may be one bit, and the plurality of memory units comprised in the predetermined memory space 400 may form a bit map to record the information regarding the data to be backed up of the memory device.

According to the first embodiment of the invention, each memory unit or each bit may represent a consecutive logical memory space (such as the logical memory space 460 shown in FIG. 4) of the memory device (such as the flash memory 123), wherein the size of one consecutive logical memory space may be set to, for example, 4 Kilobytes (KB), or set to the size of a logical block addressed by one LBA. Depending on the system requirements, the size of one logical block may be 512 bytes, 1024 bytes or 4K bytes.

According to an embodiment of the invention, one memory unit may correspond to a plurality of logical addresses, therefore, there is a one-to-many relationship between memory unit and logical addresses. In other words, in the embodiments of the invention, the data recorded in the predetermined memory space 400 may be compressed data. The memory controller 121/200 may completely record the information regarding the data to be backed up of the whole memory spaces of the memory device (such as the flash memory 123) by simply using a relative small memory space.

For example, suppose that the memory controller 121/200 uses one bit to represent the memory space of 4K bytes, and suppose that the overall size of the memory device (for example, the size of the memory space 450) is 256 Gigabyte (GB), the number of bits required to completely record the information regarding the data to be backed up of the whole memory space of the memory device would be 256 GB/4 Kb=64 million, which is equivalent to a 8 Megabyte (MB) memory space. In other words, the memory controller 121/200 can completely record the information regarding the data to be backed up corresponding to a 256 GB memory space with only a 8 MB of memory space.

According to an embodiment of the invention, the information regarding the data to be backed up may initially be set to a default value or a default status (or, may be regarded as an initial value or an initial status) in the very beginning of using the memory device (for example, when the memory device is just initialized by the host device 110). For example, in the first embodiment of the invention, the memory controller 121/200 may initially set the value corresponding to each memory unit or each bit to zero. Therefore, the default value of the information regarding the data to be backed up recorded in the predetermined memory space 400 may be an all-zero value. Suppose that the predetermined memory space 400 forms a bit map, the default value of the bit map may be an all-zero pattern. After that, the processor 240 may update the information regarding the data to be backed up according to the commands received from the host device.

According to an embodiment of the invention, the commands received by the processor 240 from the host device 110 may comprise a write command. The write command may comprise a starting LBA and a length. In response to reception of the write command, the processor 240 may select one or more bits to be updated according to the starting LBA and the length, and set the value(s) corresponding to said one or more bits to a predetermined value that is different from the aforementioned initial value or default value, where the predetermined value is utilized to represent the data to be backed up (or, the data that has been updated by the user). Or, in another embodiment of the invention, in response to reception of the write command, the processor 240 may calculate a range or an area in the predetermined memory space that has to be marked in response to this write operation according to the starting LBA and the length, and mark a status of the calculated range or area as a predetermined status that is different from the aforementioned initial status or default status and is capable of representing the data that has been updated, so as to indicate that data currently associated with the memory space of the memory device corresponding to this range or area is the data to be backed up.

For example, suppose that the size of data to be written in response to a write command is 128 KB and one bit in the bit map represents a memory space of 4 KB. In response to this write command, the number of bits having the corresponding value to be updated would be 128K/4K=32. The processor 240 may determine which bits having the corresponding value to be updated according to the starting LBA and the length of the data to be written, and set the values of the bits to the predetermined value.

It should be noted that according to the first embodiment of the invention, there may be at least two implementations for updating the information regarding the data to be backed up. In the first implementation, the processor 240 first determines which bit(s) in the bit map or which range(s) or area(s) in the predetermined memory space have to be updated, reads the content of the predetermined memory space (e.g. predetermined memory space 400) to determine which value or status is currently set or marked for the corresponding bit(s), or range(s) or area(s), and sets the value(s) for the bit(s) that have not been set to the correct value or mark the status(s) for the range(s) or area(s) that have not been marked as the correct status. For example, suppose that the processor 240 determines that the $1^{st}$~$8^{th}$ bits in the bit map have to be updated in response to a write command and knows the values currently set for the $1^{st}$~$8^{th}$ bits are 11110011 by reading the content of the predetermined memory space 400, where the value "0" is the default value and the value "1" represents the data to be backed up, the processor 240 may only change the values of the $5^{th}$ and $6^{th}$ bits as "1" in the first implementation. In the second implementation, after determining which bit(s) in the bit map or which range(s) or area(s) in the predetermined memory space have to be updated, the processor 240 may directly set the value of the bit(s) in the bit map to the correct value or mark the status(s) of the range(s) or area(s) as the correct status, regardless of which value or status was previously set or marked for the corresponding bit(s), or range(s) or area(s). Using the aforementioned example, when the processor 240 determines that the $1^{st}$~$8^{th}$ bits in the bit map have to be updated in response to a write command, the processor 240 directly sets or marks the values corresponding to all of the $1^{st}$~$8^{th}$ bits to "1" regardless of whether the values corresponding to the $1^{st}$~$8^{th}$ bits were previously set to "1" or not.

According to an embodiment of the invention, the commands received by the processor 240 from the host device 110 may comprise a delete command or a trim command. The delete or trim command may comprise a starting LBA and a length. In response to reception of the delete or trim command, the processor 240 may select one or more bits to be updated according to the starting LBA and the length, and set the value(s) corresponding to said one or more bits to another value different from the aforementioned predetermined value, for example, reset the value(s) corresponding to said one or more bits to the default value or the initial value, so as to represent that the corresponding data has been deleted or is not the data to be backed up (does not have to be backed up). Or, in another embodiment of the invention, in response to reception of the delete or trim command, the processor 240 may calculate a range or an area in the predetermined memory space that has to be marked in response to this delete or trim operation according to the starting LBA and the length, and mark a status of the calculated range or area as a status capable of representing that the corresponding data has been deleted or is not the data to be backed up.

It should be noted that in an embodiment of the invention, the processor 240 may only update the information regarding the data to be backed up according to the write command received from the host device. That is, the processor 240 may not update the information regarding the data to be backed up according to the delete operation or the delete or trim command received from the host device. In another embodiment of the invention, the processor 240 may update the information regarding the data to be backed up according to the write command and delete or trim command received from the host device. As discussed above, the processor 240 may set the value of the bit(s) in the bit map or mark the status(s) of the range(s) or area(s) as a status capable of representing that the corresponding data has been deleted or is not the data to be backed up in response to the delete operation.

In yet another embodiment of the invention, each memory unit may comprise a plurality of bits for recording a variety of statuses. For example, in response to a write command, the processor 240 may set or mark a status of the corresponding memory unit or a corresponding range/area in the predetermined memory space as a first status, so as to indicate that the corresponding data is the data to be backed up (or, the data that has been updated by the user). In response to a delete or trim command, the processor may determine whether to set or mark a status of the corresponding memory unit or a corresponding range/area in the predetermined memory space as a second status or to reset it as the default status based on the status currently set or remarked thereof. For example, when the status of the corresponding memory unit or range/area is currently set or marked as the first status, it means that the current delete operation is to delete the data that has been updated but not yet backed up. In this manner, the processor 240 may reset the status of the corresponding memory unit or range/area as the default status. When the status of the corresponding memory unit or range/area is currently set or marked as the default status, it means that the current delete operation is to delete the data that has been backed up. In this manner, the processor 240 may set or mark the status of the corresponding memory unit or range/area as the second status, for indicating that the corresponding data can be deleted in the backup operation performed later in response to the current user operation.

According to the second embodiment of the invention, the aforementioned predetermined memory space may store a plurality of records. Each record may comprise at least a first field and a second field, The first field may be utilized to record the starting LBA of the data to be backed up (or to be updated), and the second field may be utilized to record the length of the data to be backed up (or to be updated). For example, in the second embodiment of the invention, in response to reception of to write command, the processor 240 may add a record, record the starting LBA carried in the write command in the first field of this record, and record the length of this record. The processor may add a corresponding record in the predetermined memory space for each write command based on the sequence of the reception time at which the corresponding write command is received, for recording the starting LBA and the length of the corresponding write operation.

In addition, as discussed above, in an embodiment of the invention, the processor 240 may only update the information regarding the data to be backed up according to the write command received from the host device. That is, the processor will not update the information regarding the data to be backed up according to the delete operation or the received delete command. In another embodiment of the invention, the processor 240 may update the information regarding the data to be backed up according to the write command and delete or trim command received from the host device. For example, each record may comprise a first field, a second field and a third field. The first field may be utilized to record the starting LBA of the data to be backed up (or to be updated), the second field may be utilized to record the length of the data to be backed up (or to be updated) and the third field may be utilized to record the way to back up the data or the way to update the backup data. For example, when the corresponding command is a write command, the third field may be set to a value or status representing that the way to back up the data or update the backup data is to "write the data"; and when the corresponding command is a delete command, the third field may be set to another value or status representing that the way to back up the data or update the backup data is to "delete the data".

In the second embodiment of the invention, suppose that the size of the predetermined memory space for recording the information regarding the data to be backed up is 32 MB, and the size of each record is 8 bytes, where 4 bytes is utilized to store the information of the first field and the other 4 bytes is utilized to store the information of the second field, in the implementation when the processor 240 only updates the information regarding the data to be backed up according to the write command received from the host device, the 32 MB memory space may be utilize to store 32 MB/8 Byte=4M records, where each record corresponds to a write command or a write operation. If the size of a write operation of the host device 110 is 128 KB, the amount of data that can be recorded in the information stored in the predetermined memory space as the data to be backed up would be 128 KB*4M=512 GB, which is already a huge amount of data for a normal user. In other words, in either the first embodiment or the second embodiment of the invention, the memory controller 121/200 may completely record the information regarding the data to be updated for the whole memory spaces of the memory device (such as the flash memory 123) by simply using a relative small memory space. In addition, in an embodiment of the invention, the processor 240 may also determine whether the capacity of the predetermined memory space is about to be insufficient. For example, when the remaining capacity of the predetermined memory space is lower than a predetermined threshold, the processor 240 may determine that the capacity of the predetermined memory space is about to be insufficient. When the processor 240 determines that the capacity of the predetermined memory space is about to be insufficient, it means that the amount of data to be backed up already reached a certain level, and the processor 240 may notify the host device 110 to send a reminder message to inform the user that the data backup should be performed as soon as possible.

According to an embodiment of the invention, the commands received by the processor 240 from the host device 110 may also comprise a data backup command. In response to reception of a data backup command, the processor 240 may provide the currently recorded information regarding the data to be backed up to the host device 110 via the host interface, for the host device 110 or a specific data backup software jointly developed with the proposed memory controller 121/200 is capable of correctly recognizing the data associated with which logical memory spaces of the memory device is the data that has to be backed up in this data backup operation.

Figure 5:
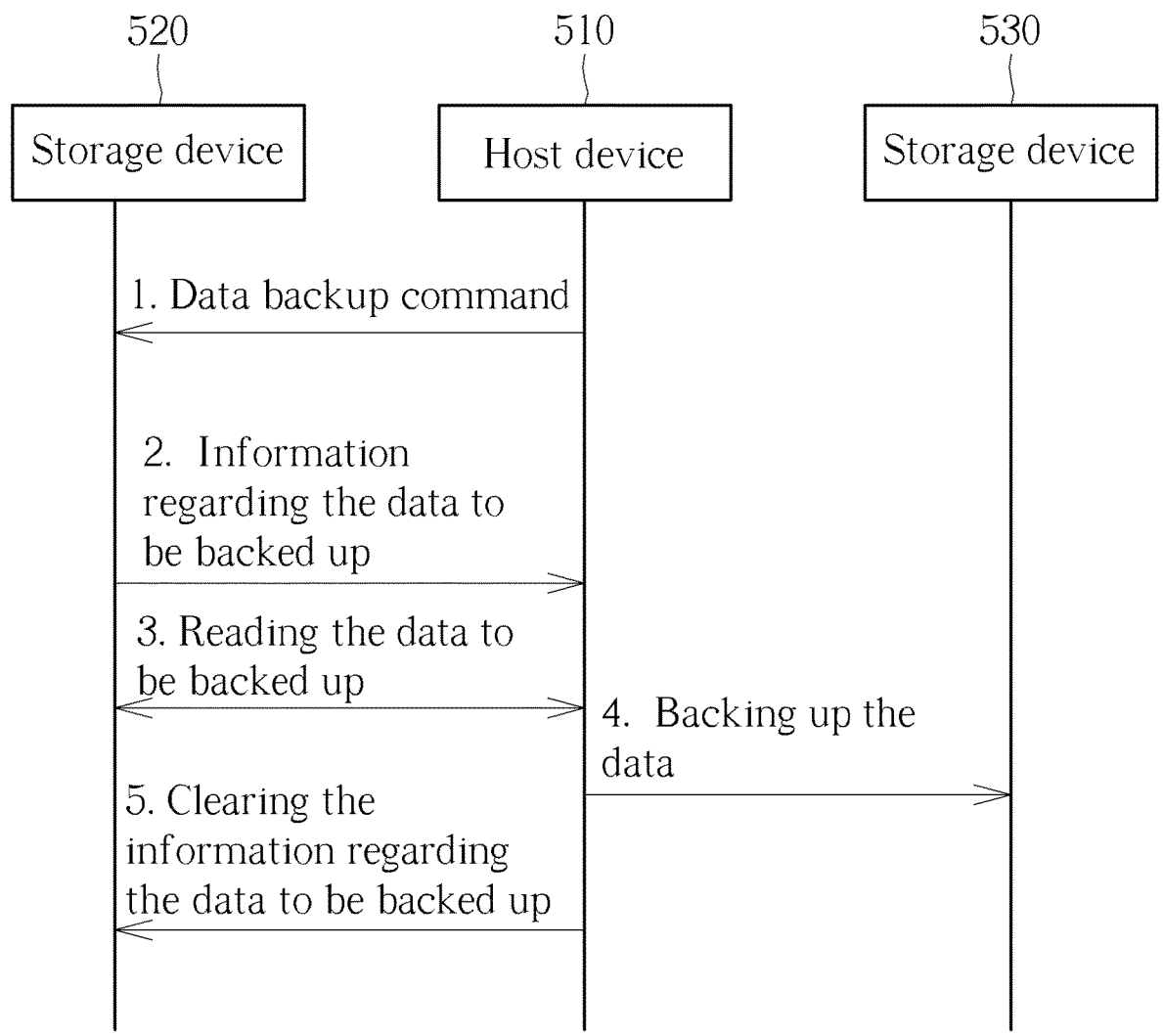
FIG. 5 is a schematic diagram showing the data backup operation according to an embodiment of the invention.

FIG. 5 is a schematic diagram showing the data backup operation according to an embodiment of the invention. When performing the data backup operation, there may be three devices comprised in the system, comprising a host device 510 and storage devices 520 and 530. The storage device 520 may be an existing storage device in the system and the storage device 530 may be a storage device utilized for storing the backup data. The host device 510 may perform the data backup operation by executing the aforementioned data backup software jointly developed with the proposed memory controller 121/200.

First of all, the host device 510 may issue a data backup command to the existing storage device 520. In response to the data backup command, the processor 240 may provide the information regarding the data to be backed up that it maintained to the host device 510. Upon receiving the information regarding the data to be backed up, the host device 510 may read the area storing the data to be backed up in the storage device 520 according to this information. For example, the host device 510 may calculate the corresponding logical memory space (for example, the starting LBA and length) according to the indices or locations of the bits being set to the predetermined value (or, the region or area having the status being marked as the predetermined status) and access the storage device 520 to read the data stored therein. Then, the host device 510 may store the data to be backed up into the storage device 530 according to the corresponding logical memory space where the data originally stored in the storage device 520. For example, the host device 510 may, starting from the location indicated by the first memory unit, the first bit, the first region or area or the first record stored in the predetermined memory space, sequentially perform the corresponding data backup operation.

The operations of reading data to be backed up from the storage device 520 and writing the data into the storage device 530 may be repeatedly performed until all the data recorded in the information by the processor 240 as the data to be backed up has been copied and written into the storage device 530, or until all the data to be backed up (including the data to be deleted) has been backed up. Thereafter, the host device 510 may issue a backup complete command to the storage device 520. In response to reception of the backup complete command, in the first embodiment of the invention, the processor 240 may set the information regarding the data to be backed up to the default value or the default status (or, the aforementioned initial value or an initial status), or, in the second embodiment of the invention, the processor 240 may delete or clear the information recorded in the predetermined memory space regarding the data to be backed up. In FIG. 5, the operation of clearing the information regarding the data to be backed up is shown as a representative of the above embodiment. It should be noted that FIG. 5 shows a simplified operation flow, and the person with ordinary skilled in the art will be readily appreciated that each operation shown in the figure may be carried out by performing the read/write/erase operation of the memory device in response to one or more commands.

As discussed above, in the proposed data processing method, the memory controller keeps recording information regarding the data to be backed up according to the latest access operation. With the aid of this information, the host device or a specific data backup software is capable of correctly recognizing data associated with which logical memory spaces of the memory device is the data to be backed up, and is able to quickly pick up the data to be backed up and write the data into another storage device. In this manner, when performing the data backup is required, the data backup can be performed in a more efficient and simple way by only providing the information regarding the data to be backed up to the host device 110 or the specific data backup software and the problem of the need of considering the compatibility of different operating systems when developing the disk backup software due to the requirement of parsing the file system supported by the operation system of the computer device to obtain the information of the files in the conventional design can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory controller coupled to a memory device, comprising:
   a host interface, arranged to receive a plurality of commands from a host device; and
   a processor, coupled to the host interface and arranged to record information regarding data to be backed up of the memory device, wherein the information is used to indicate data associated with which logical memory space is the data to be backed up, and the processor is arranged to configure a predetermined memory space for storing the information and update the information according to the plurality of commands,
   wherein in response to reception of a data backup command, the processor is further arranged to provide the information to the host device via the host interface.

2. The memory controller of claim 1, wherein the plurality of commands comprise a backup complete command, and in response to reception of the backup complete command, the processor is further arranged to set the information to a default value.

3. The memory controller of claim 1, wherein the predetermined memory space comprises a plurality of memory units, and each memory unit corresponds to a logical memory space of the memory device.

4. The memory controller of claim 3, wherein each individual logical memory space covers one logical block address (LBA) or a plurality of consecutive LBAs.

5. The memory controller of claim 3, wherein the information is represented by a plurality of bits, each bit is associated with one memory unit, and the processor is arranged to record the information by setting values corresponding to the bits.

6. The memory controller of claim 5, wherein the plurality of commands comprises a write command, the write command comprises a starting LBA and a length, and in response to reception of the write command, the processor is arranged to select one or more of the bits according to the starting LBA and the length, and set the value(s) corresponding to said one or more of the bits to a predetermined value.

7. The memory controller of claim 1, wherein the plurality of commands comprise a write command, the write command comprises a starting LBA and a length, and the predetermined memory space stores a plurality of records, each record comprises a first field and a second field, and in response to reception of the write command, the processor is arranged to record the starting LBA in the first field of a record and record the length in the second field of the record.

8. A data processing method, comprising:
configuring a predetermined memory space to record information regarding data to be backed up of a memory device, wherein the information is used to indicate data associated with which logical memory space is the data to be backed up; and
updating the information according to a plurality of commands received from a host device,
wherein step of updating the information according to the plurality of commands received from the host device further comprises:
providing the information to the host device via a host interface in response to reception of a data backup command.

9. The data processing method of claim 8, further comprising:
setting the information to a default value in response to reception of a backup complete command.

10. The data processing method of claim 8, wherein the predetermined memory space comprises a plurality of memory units, and each memory unit corresponds to a logical memory space of the memory device.

11. The data processing method of claim 10, wherein each individual logical memory space covers one logical block address (LBA) or a plurality of consecutive LBAs.

12. The data processing method of claim 10, wherein the information is represented by a plurality of bits, each bit is associated with one memory unit, and step of configuring the predetermined memory space to record the information regarding the data to be backed up of the memory device further comprises:
recording the information by setting values corresponding to the bits.

13. The data processing method of claim 12, wherein the plurality of commands comprises a write command, the write command comprises a starting LBA and a length, and step of updating the information according to the plurality of commands received from the host device further comprises:
selecting one or more of the bits according to the starting LBA and the length in response to reception of the write command; and
setting the value(s) corresponding to said one or more of the bits to a predetermined value.

14. The data processing method of claim 8, wherein the plurality of commands comprise a write command, the write command comprises a starting LBA and a length, and the predetermined memory space stores a plurality of records, each record comprises a first field and a second field, and step of updating the information according to the plurality of commands received from the host device further comprises:
recording the starting LBA in the first field of a record and recording the length in the second field of the record.

* * * * *